H. L. RISSMAN.
GARMENT.
APPLICATION FILED FEB. 6, 1919.

1,352,027.

Patented Sept. 7, 1920.

Inventor
Henry L. Rissman

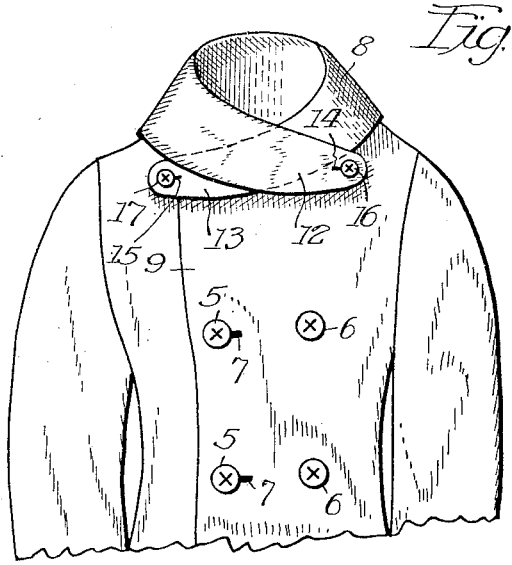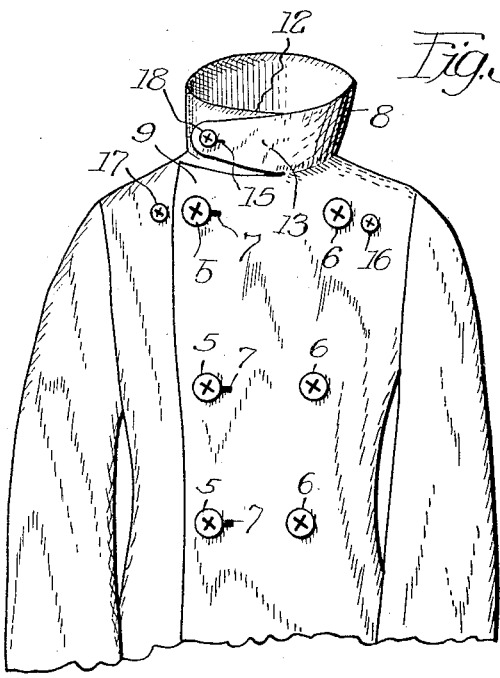

UNITED STATES PATENT OFFICE.

HENRY L. RISSMAN, OF CHICAGO, ILLINOIS.

GARMENT.

1,352,027.  Specification of Letters Patent.  Patented Sept. 7, 1920.

Application filed February 6, 1919. Serial No. 275,323.

*To all whom it may concern:*

Be it known that I, HENRY L. RISSMAN, a citizen of the United States, and a resident of Chicago, in the county of Cook and State of Illinois, have invented certain new and useful Improvements in Garments, of which the following is a specification.

My invention relates to garments, more especially to men's overcoats.

The object of the invention is to provide improved construction and arrangement at the neck of the coat, particularly in a double-breasted or so-called ulster type, to adapt it for various adjustments and for enabling it to be worn with greater protection against the weather.

In accordance with my invention I provide extensions on the collar in the form of flaps which can be brought above or below the coat lapels to be closed in various positions across the neck. Normally the flaps are hidden below the lapels to give the ordinary coat appearance, but when the coat is buttoned the collar may be rolled up half way with the flaps extending across the chest near the shoulders and buttoned in place near the shoulders, or the collar may be entirely raised and the flaps crossed around the front of the neck and buttoned in place.

My improved arrangement is clearly shown on the accompanying drawings in which—

Fig. 2 is a front view of the upper part of the coat showing the collar rolled up half way with the flaps crossed and buttoned against the front of the coat, and Fig. 3 is a front view of the upper part of the coat showing the collar entirely up and the flaps buttoned across the throat.

Figure 1:
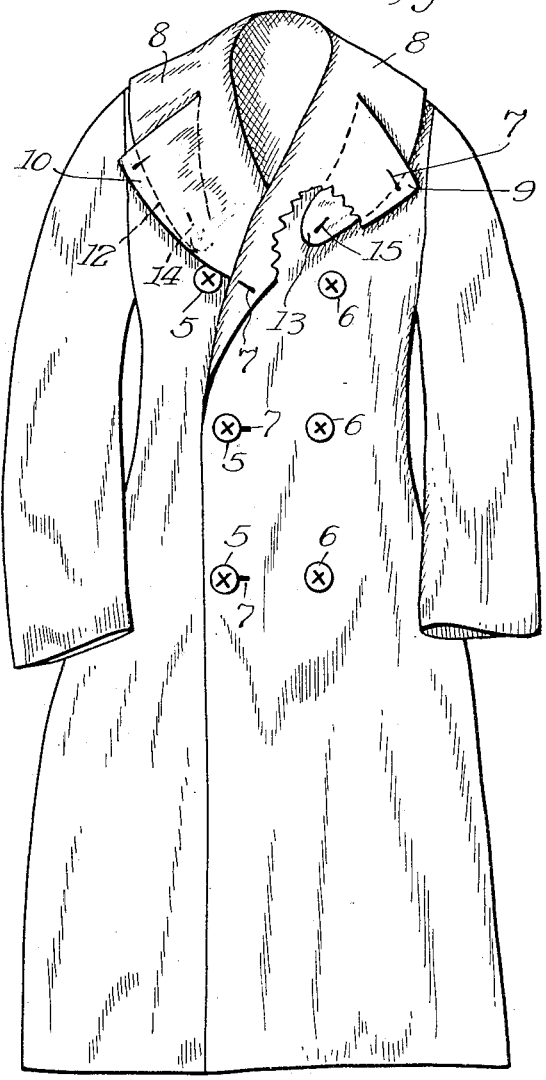
Figure 1 is a front view of a coat showing the flaps in normal position.

The coat shown is of the double-breasted or ulster type, the wings of the coat being provided respectively with the buttons 5 and 6, each wing having corresponding button holes 7. 8 represents the collar and 9 and 10 the lapels. In ordinary coats there is usually a slit or gore between the collar proper and the lapels but in accordance with my invention I extend the front ends of the collar forwardly to form flaps 12 and 13, which in normal position are below the lapels, as clearly shown in Fig. 1, so that the coat when the collar is down has the ordinary appearance. The lapels have the button holes 14 and 15 at their ends and on the coat near the shoulders are the buttons 16 and 17 for receiving the flap button holes. On the under side of the collar at the right side thereof is also the button 18 for receiving the button hole of the flap 13.

When the coat is partly buttoned and the collar and lapels are down then the flaps will be below the lapels as shown in Fig. 1. When the coat is buttoned all the way up the collar can be held either partly or fully up. After buttoning up of the coat the flaps may be brought out from under the lapels and carried across the chest at the base of the neck and buttoned against the chest by the buttons 16 and 17, as shown in Fig. 2. When the collar is fully raised, as shown in Fig. 3, the flap 12 is carried across and around the neck and the flap 13 carried across the outside and buttoned by the button 18. In each case the flaps will hold the collar in adjustable position.

I thus produce a coat which is very useful in accommodating itself to various weather conditions. When the collar is part way up the crossed flaps will hold it in such position and the throat of the wearer will be fully protected. When the collar is entirely up the flaps will hold it in this position and the ears, face and head will be fully protected.

I do not, of course, desire to be limited to the exact construction and arrangement shown and described as changes and modifications are no doubt possible which would still come within the scope of the invention.

I claim as follows:

A coat having a collar and lapels, flaps forming continuations of and extending downwardly from said collar along the shoulders, said flaps being hidden beneath said lapels when the coat collar is down, said flaps being adapted to be crossed in front of the neck and to be entirely exposed to view when the coat is buttoned and the collar partly raised, and buttons on the coat for receiving the flaps and holding them in crossed position.

In witness whereof, I hereunto subscribe my name this 20th day of Jany., A. D., 1919.

HENRY L. RISSMAN.